US012563348B2

(12) United States Patent
Perez Cruz et al.

(10) Patent No.: US 12,563,348 B2
(45) Date of Patent: Feb. 24, 2026

(54) IDLE TONE MITIGATION USING CLOCK JITTER

(71) Applicant: Infineon Technologies AG, Neubiberg (DE)

(72) Inventors: Carlos Andres Perez Cruz, Villach (AT); Andres Quintero Alonso, Villach (AT); Pedro Augusto Borrego Lambin Torres Amaral, Villach (AT); Dietmar Straeussnigg, Villach (AT); Andreas Wiesbauer, Pörtschach (AT); Luis Hernandez-Corporales, Madrid (ES)

(73) Assignee: Infineon Technologies AG, Neubiberg (DE)

( * ) Notice: Subject to any disclaimer, the term of this patent is extended or adjusted under 35 U.S.C. 154(b) by 85 days.

(21) Appl. No.: 18/624,846

(22) Filed: Apr. 2, 2024

(65) Prior Publication Data

US 2025/0310699 A1 Oct. 2, 2025

(51) Int. Cl.
*H04R 19/04* (2006.01)
*H04R 19/00* (2006.01)

(52) U.S. Cl.
CPC .......... *H04R 19/04* (2013.01); *H04R 19/005* (2013.01); *H04R 2201/003* (2013.01)

(58) Field of Classification Search
None
See application file for complete search history.

(56) References Cited

U.S. PATENT DOCUMENTS

| | | | | |
|---|---|---|---|---|
| 9,578,424 | B2 * | 2/2017 | Sridharan | H03L 7/099 |
| 9,976,924 | B2 * | 5/2018 | Straeussnigg | G01L 19/00 |
| 11,843,907 | B1 * | 12/2023 | Chen | H03F 3/505 |
| 2013/0208915 | A1 * | 8/2013 | Hammerschmidt | H04R 3/00 381/98 |
| 2019/0259400 | A1 * | 8/2019 | Lesso | G10L 21/0208 |

OTHER PUBLICATIONS

Taylor et al., "A Mostly-Digital Variable-Rate Continuous-Time Delta-Sigma Modulator ADC," IEEE Journal of Solid-State Circuits, vol. 45, No. 12, Dec. 2010, pp. 2634-2646, 13 pages total.

* cited by examiner

*Primary Examiner* — Paul W Huber
(74) *Attorney, Agent, or Firm* — Slater Matsil, LLP

(57) ABSTRACT

A circuit includes: a capacitive micro-electromechanical system (MEMS) microphone configured to generate a voltage signal in response to a sound signal; a voltage-controlled oscillator (VCO) coupled to the capacitive MEMS microphone, where the VCO is configured to generate a frequency modulated signal having a frequency proportional to the voltage signal; a frequency-to-digital (FTD) converter coupled to an output terminal of the VCO; a random number generator configured to generate random numbers; and a phase modulator configured to generate a phase modulated clock signal by modulating a phase of a system sampling clock signal in accordance with the random numbers, where the FTD converter is configured to generate a digital signal in accordance with the frequency modulated signal and the phase modulated clock signal, and is configured to sample the digital signal by the phase modulated clock signal to generate a digital output signal of the FTD converter.

20 Claims, 12 Drawing Sheets

IDLE TONE MITIGATION USING CLOCK JITTER

TECHNICAL FIELD

The present invention relates generally to circuits, and in particular embodiments, to circuits that include a capacitive micro-electromechanical system (MEMS) microphone and a voltage-controlled-oscillator-based analog-to-digital converter (VCO-ADC) coupled to the MEMS microphone.

BACKGROUND

Micro-electromechanical system (MEMS) microphones are now widely used in electronic devices due to their small format factors and low cost. Traditionally, the analog output of a microphone is converted into a digital output signal by a voltage encoding-based system, which converts the output voltage of the microphone into the digital output signal using an analog-to-digital converter (ADC).

Voltage-controlled-oscillator-based ADCs (VCO-ADCs) are promising alternatives to conventional voltage encoding-based systems, and are well suited for low-cost digital microphone (e.g., MEMS microphone) applications. For example, in a capacitive MEMS microphone system equipped with a VCO-ADC readout circuit, a voltage is generated by the MEMS microphone as a response to a sound pressure. The voltage modulates the oscillator frequency of the VCO in the VCO-ADC readout circuit. Then, a frequency to-digital (FTD) converter measures the frequency of the oscillator at a sampling rate defined by a system sampling clock signal. While VCO-ADCs have advantages over the conventional voltage encoding-based systems, challenges remain for using VCO-ADCs in MEMS microphone systems.

SUMMARY

In accordance with an embodiment, a circuit comprising: a capacitive micro-electromechanical system (MEMS) microphone configured to output a voltage signal in response to a sound signal; and a voltage-controlled-oscillator-based analog-to-digital converter (VCO-ADC) coupled to the capacitive MEMS microphone and configured to generate a digital output signal proportional to the voltage signal, wherein the VCO-ADC comprises: a voltage-controlled-oscillator (VCO) coupled to the capacitive MEMS microphone and configured to output a frequency modulated signal having a frequency proportional to the voltage signal; a frequency-to-digital (FTD) converter coupled to an output terminal of the VCO; a random number generator configured to generate random numbers; and a phase modulator configured to generate a phase modulated clock signal by modulating a phase of a system sampling clock signal with the random numbers, wherein the FTD converter is configured to generate a digital signal in accordance with the frequency modulated signal and the phase modulated clock signal, and is configured to generate the digital output signal of the FTD converter by sampling the digital signal using the phase modulated clock signal.

In accordance with an embodiment, a circuit includes: a capacitive micro-electromechanical system (MEMS) microphone configured to generate a voltage signal in response to a sound signal; a voltage-controlled oscillator (VCO) coupled to the capacitive MEMS microphone, wherein the VCO is configured to generate a frequency modulated signal having a frequency proportional to the voltage signal; a frequency-to-digital (FTD) converter coupled to an output terminal of the VCO; a random number generator configured to generate random numbers; and a phase modulator configured to generate a phase modulated clock signal by modulating a phase of a system sampling clock signal in accordance with the random numbers, wherein the FTD converter is configured to generate a digital signal in accordance with the frequency modulated signal and the phase modulated clock signal, and is configured to sample the digital signal by the phase modulated clock signal to generate a digital output signal of the FTD converter.

In accordance with an embodiment, a method of operating a micro-electromechanical system (MEMS) microphone system includes: generating, by a MEMS microphone, a voltage signal in response to a sound signal; generating, by a voltage-controlled oscillator (VCO) coupled to the MEMS microphone, a frequency modulated signal having a frequency proportional to the voltage signal; converting, by a frequency-to-digital (FTD) converter coupled to the VCO, the frequency modulated signal into a digital signal; generating, by a random number generator, random numbers; modulating, by a phase modulator, a phase of a system sampling clock signal in accordance with the random numbers to generate a phase modulated clock signal; and sampling the digital signal by the phase modulated clock signal to generate a digital output signal of the FTD converter.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EXAMPLES

Figure 1:
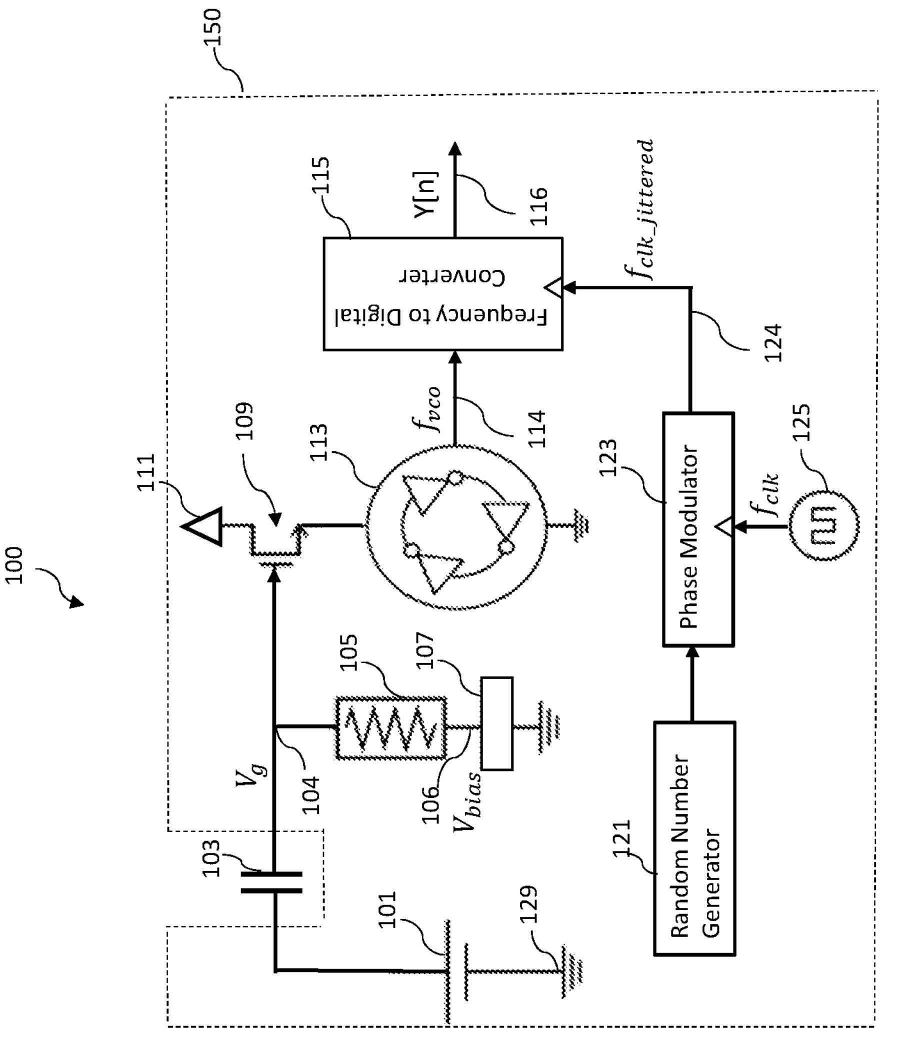
FIG. 1 illustrates a micro-electromechanical system (MEMS) microphone system that includes a capacitive MEMS microphone and a voltage-controlled-oscillator-based analog-to-digital converter (VCO-ADC), in an embodiment.

The making and using of the presently disclosed examples are discussed in detail below. It should be appreciated, however, that the present invention provides many applicable inventive concepts that can be embodied in a wide variety of specific contexts. The specific examples discussed are merely illustrative of specific ways to make and use the invention, and do not limit the scope of the invention. Throughout the discussion herein, unless otherwise specified, the same or similar reference numerals in different figures refer to the same or similar component. For simplicity, details of components with the same or similar reference numeral may not be re-described.

The present disclosure will be described with respect to examples in a specific context, and in particular, a MEMS microphone system that includes a capacitive MEMS microphone and a VCO-ADC readout circuit.

FIG. 1 illustrates a system diagram of a MEMS microphone system 100 that includes a capacitive MEMS microphone and a voltage-controlled-oscillator-based analog-to-digital converter (VCO-ADC), in an embodiment. Note that for simplicity, not all features of the MEMS microphone system 100 are illustrated.

As illustrated in FIG. 1, the MEMS microphone system 100 includes a capacitive MEMS microphone 103, which is configured to generate an output voltage $V_g$ in response to a sound signal. In the example of FIG. 1, the capacitive MEMS microphone 103 is or includes a capacitor, where one or more membranes of the capacitor vibrate in response to the sound pressure to generate the output voltage $V_g$. A high voltage bias (e.g., +12 V voltage) is supplied to the capacitive MEMS microphone 103 to bias the capacitive MEMS microphone 103. The high voltage bias may be provided by a voltage supply 101 (e.g., a charge pump circuit) coupled between the capacitive MEMS microphone 103 and a reference node 129, which reference node 129 is configured to be coupled to a reference voltage, such as electrical ground. An output terminal of the capacitive MEMS microphone 103 is coupled to a node 104. A high-ohmic resistor 105 (e.g., having a resistance in the order of giga-ohms) is coupled between the node 104 and a node 106. In the illustrated embodiment, a bias voltage $V_{bias}$ is provided at the node 106 to set an operating point (e.g., a rest frequency) of the MEMS microphone system 100. As an example, the bias voltage $V_{bias}$ at the node 106 may be provided by a bias circuit 107. The bias circuit 107 is designed to generate an appropriate bias voltage for the capacitive MEMS microphone 103. Bias circuits are known and used in MEMS microphone systems, details are not discussed here.

In FIG. 1, an input stage circuit 109 is coupled between the node 104 and an input terminal of a voltage-controller-oscillator (VCO) 113. In the example of FIG. 1, the input stage circuit 109 is a source follower circuit comprising a transistor. A gate terminal of the transistor is coupled to the node 104. A drain terminal of the transistor is coupled to a supply voltage node 111 configured to receive a supply voltage (e.g., +3V, +5V, or the like) for the MEMS microphone system 100. A source terminal of the transistor is coupled to the input terminal of the VCO 113. In some embodiments, the input stage circuit 109 (e.g., a source follower circuit) provides a buffered voltage to the VCO 113, which buffered voltage has a voltage value proportional to the output voltage $V_g$ of the capacitive MEMS microphone 103.

The VCO 113 is configured to generate an output signal $f_{vco}$. The frequency of the output signal $f_{vco}$ is modulated (e.g., controlled) by the output voltage $V_g$ of the capacitive MEMS microphone 103. In some embodiments, the frequency of the output signal $f_{vco}$ generated by the VCO 113 is proportional to the output voltage $V_g$, and therefore, the output signal $f_{vco}$ of the VCO 113 is also referred to as a frequency modulated signal $f_{vco}$. The VCO 113 is a ring oscillator, in an example embodiment, although any other suitable type of VCO may also be used as the VCO 113. Voltage controlled oscillators, such as ring oscillators, are known and used in the art, thus details are not discussed here.

Still referring to FIG. 1, an output terminal 114 of the VCO 113 is coupled to an input terminal of a frequency-to-digital (FTD) converter 115. The FTD converter 115 is configured to convert the frequency modulated signal $f_{vco}$ into a digital output signal y [n] (e.g., a multi-bit digital signal) at an output terminal 116 of the FTD converter 115. In some embodiments, the FTD converter 115 is configured to generate a digital signal (see, e.g., 430 in FIG. 4B) in accordance with the frequency modulated signal $f_{vco}$ and a phase modulated clock signal $f_{clk\_jittered}$, and is configured to generate the digital output signal y [n] by sampling the digital signal using the phase modulated clock signal $f_{clk\_jittered}$. Details of the phase modulated clock signal $f_{clk\_jittered}$ and the FTD converter 115 are discussed hereinafter.

In FIG. 1, the MEMS microphone system 100 further includes a random number generator 121 and a phase modulator 123. The random number generator 121 is configured to generate random numbers. The random numbers generated are sent to the phase modulator 123. The phase modulator 123 receives the random numbers and a system sampling clock signal $f_{clk}$, and modulates the phase of the system sampling clock signal $f_{clk}$ in accordance with the random numbers to generate the phase modulated clock signal $f_{clk\_jittered}$. The phase modulated clock signal $f_{clk}$ jittered is then sent to a clock input terminal of the FTD converter 115. More details are discussed hereinafter.

In some embodiments, the components within the region defined by the dashed line 150 in FIG. 1 are integrated into a semiconductor die, e.g., in an application specification integrated circuit (ASIC) or part of an ASCI. The input stage circuit 109, the VCO 113, the FTD converter 115, the random number generator 121, the phase modulator 123, and the system clock source 125 may be collectively referred to as a VCO-ADC, a VCO-ADC readout circuit, or a VCO-ADC circuit with a phase modulator.

Figure 2:
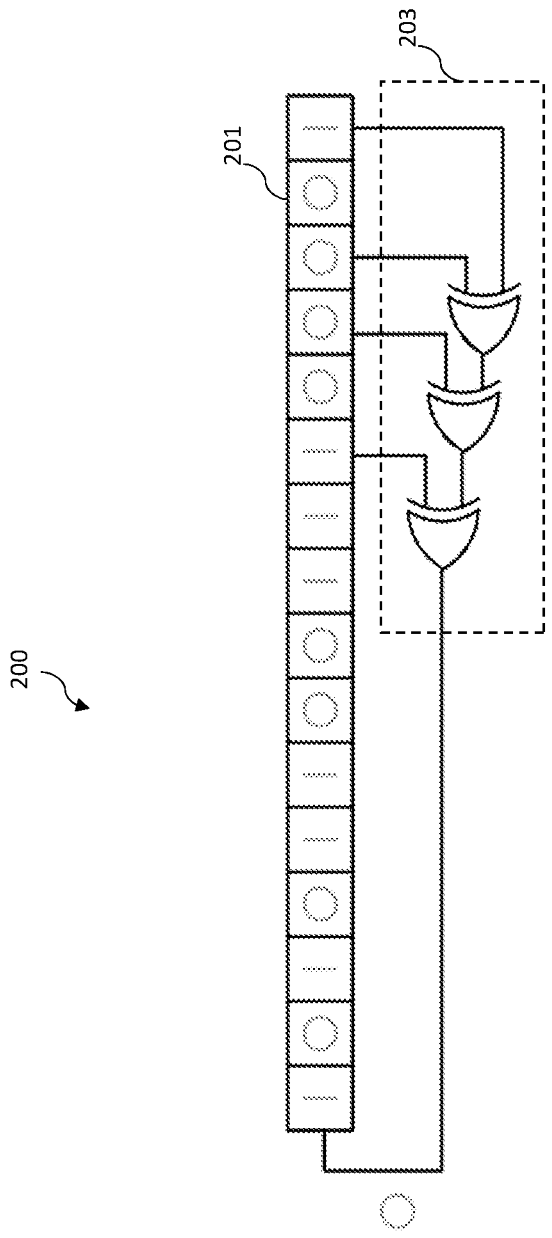
FIG. 2 illustrates a random number generator, in an embodiment.

FIG. 2 illustrates a random number generator 200, in an embodiment. The random number generator 200 may be used as the random number generator 121 in FIG. 1. The random number generator 200 is a linear feedback shift register (LFSR) random number generator that includes a plurality of registers 201 connected in series. The output terminals of some of the registers 201 are combined by a logic circuit 203, and the output of the logic circuit 203 is used as a feedback bit sent to an input terminal of the leftmost register 201. At beginning of the operation, each of the registers 201 of the LFSR random number generator 200 is initialized with a respective initial value (e.g., a bit "0" or a bit "1"), and the values of the registers 201 shift to the right during operation. The LFSR random number generator 200 can be used to generate random binary sequences or multi-bit random numbers, as skilled artisans readily appreciate. The LFSR random number generator 200 in FIG. 2 is merely a non-limiting example. Other LFSR random number generators, and other non-LFSR type random number generators are also possible and may be used as the random number generator 121 in FIG. 1. These and other variations are fully intended to be included within the scope of the present disclosure.

Figure 3A:
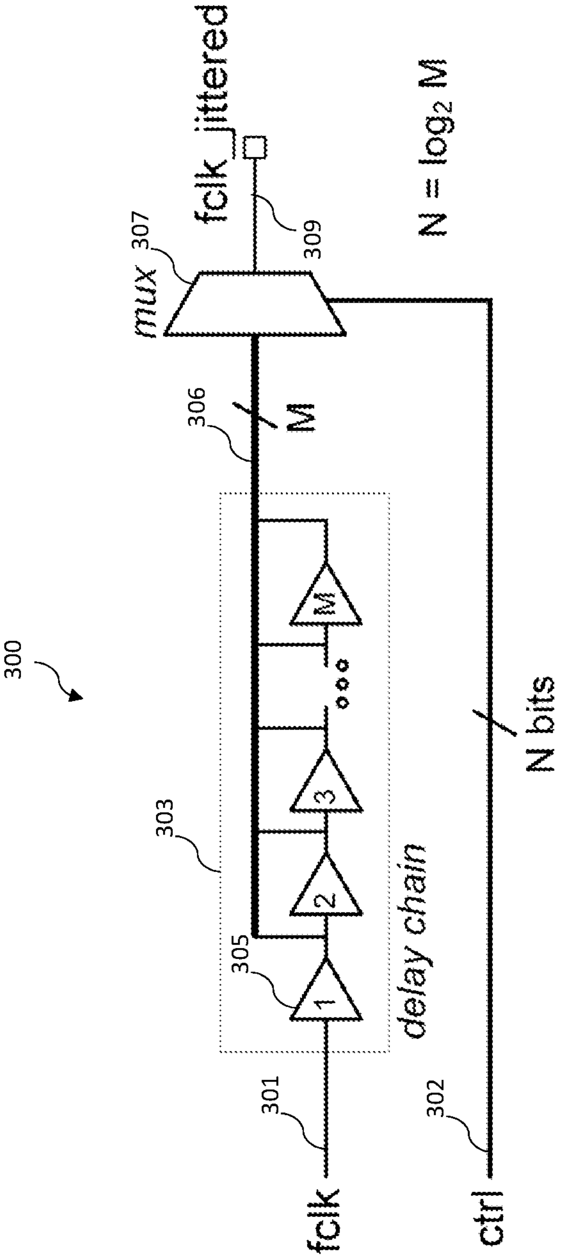
FIG. 3A illustrates a phase modulator, in an embodiment.

FIG. 3A illustrates a phase modulator 300, in an embodiment. The phase modulator 300 may be used as the phase modulator 123 in FIG. 1. As illustrated in FIG. 3A, the phase modulator 300 includes a delay chain 303 comprising a plurality of delay circuits 305 (e.g., buffers, inverters, or the like) coupled in series, where an input terminal 301 of the delay chain 303 is coupled to the system sampling clock signal folk (see also FIG. 1) generated by the system clock source 125. In embodiments where inverters are used in the delay circuits, two inverters connected in series may be used as a delay circuit 305. The system clock source 125 may include an oscillator, a phase-locked loop (PLL), combinations thereof, or the like, and is configured to generate a highly accurate digital clock signal (e.g., folk) at a specified frequency. In some embodiments, the system clock source 125 is omitted in the VCO-ADC, and the system sampling clock signal folk is provided by another clock source external to the VCO-ADC.

The phase modulator 300 further includes a multiplexer 307. Input terminals of the multiplexer 307 are coupled to output terminals of the plurality of delay circuits 305. For example, the delay chain 303 may include M delay circuits 305, and the output terminals of the M delay circuits 305 are connected to respective input terminals of the multiplexer 307. In other words, M delayed versions of the system sampling clock signal folk, each having the same frequency as the system sampling clock signal folk but with different phases, are sent to input terminals of the multiplexer 307, in some embodiments.

A control terminal 302 of the multiplexer 307 is coupled to an output terminal of the random number generator 121 in FIG. 1. The control signal (e.g., random numbers) applied at the control terminal 302 may have N bits such that $N=\log_2 M$. In some embodiments, the multiplexer 307 is configured to, based on the random numbers at the control terminal 302, select a clock signal at one of the input terminals of the multiplexer 307 and output the selected clock signal at an output terminal 309 as the phase modulated clock signal $f_{clk\_jittered}$. The output terminal 309 in FIG. 3A corresponds to the output terminal 124 of the phase modulator 123 in FIG. 1.

Figure 3B:
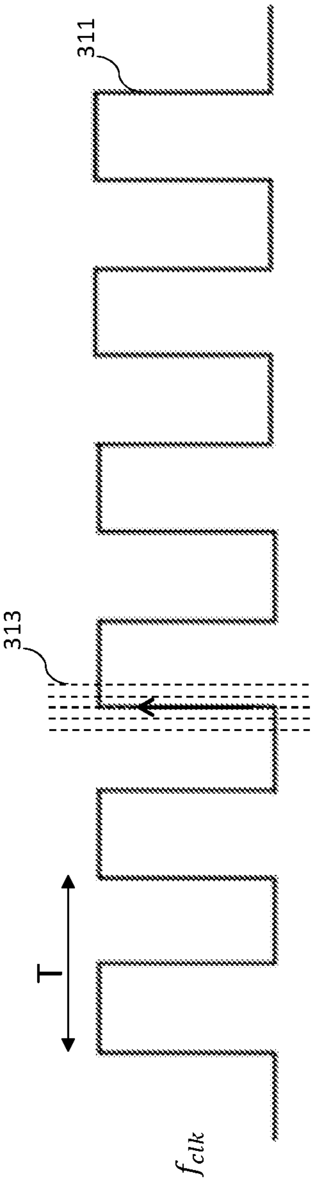
FIG. 3B illustrates the operation of the phase modulator in FIG. 3A, in an embodiment.

FIG. 3B illustrates the operation of the phase modulator 300 in FIG. 3A, in an embodiment. In FIG. 3B, the system sampling clock signal $f_{clk}$ is illustrated by the clock signal 311, which has a period of T. In the example of FIG. 3B, without loss of generality, it is assumed that the active edges of the system sampling clock signal folk are the rising edges. One of the rising edges of the system sampling clock signal folk is marked with an upward pointing arrow. The delay chain 303 of the phase modulator 300 generates M delayed versions of the system sampling clock signal folk, each with a different delay (or equivalently, a different phase). To avoid cluttering, a plurality of dashed lines 313 are illustrated in FIG. 3B to show the locations of the rising edges of the M delayed versions of the system sampling clock signal $f_{clk}$ corresponding to the rising edge of the system sampling clock signal $f_{clk}$ marked with the upward pointing arrow. Based on the random number at the control terminal 302, one of the delayed versions of the system sampling clock signal folk is selected and used as the phase modulated clock signal $f_{clk\_jittered}$.

Note that the random number generator 121 generates the random numbers at the same frequency as the frequency of the system sampling clock signal folk. In other words, for each rising edge in the system sampling clock signal folk, the random number generator 121 generates a corresponding random number, and based on that corresponding random number, one of the delayed version of the system sampling clock signal folk is selected as the phase modulated clock signal $f_{clk\_jittered}$. As a result, each rising edge of the phase modulated clock signal $f_{clk\_jittered}$ has a random phase delay (e.g., jitter) with respect to a respective rising edge of the system sampling clock signal $f_{clk}$. In other words, the phase modulator 300 generates the phase modulated clock signal $f_{clk\_jittered}$ by introducing a random phase delay (e.g., jitter) to each rising edge of the system sampling clock signal $f_{clk}$.

In some embodiments, the maximum delay $D_{max}$ of the delay chain 303, calculated as $D_{max}=M\times D$, where M is the number of delay circuits 305 and D is the time delay of each delay circuit 305, is smaller than the period T of the system sampling clock signal $f_{clk}$. For example, $D_{max}<T$, or $D_{max}<T/2$. Note that some of the dashed lines 313 in FIG. 3B arrive earlier than the corresponding rising edge of the system sampling clock signal folk marked with the upward pointing arrow, such seemingly "non-causality" may be achieved in hardware design by delaying the system sampling clock signal folk, and treating the delayed system sampling clock signal folk as the system sampling clock signal $f_{clk}$ while feeding the original (non-delayed) system sampling clock signal folk to the delay chain 303 of the phase modulator 300.

Figure 4A:
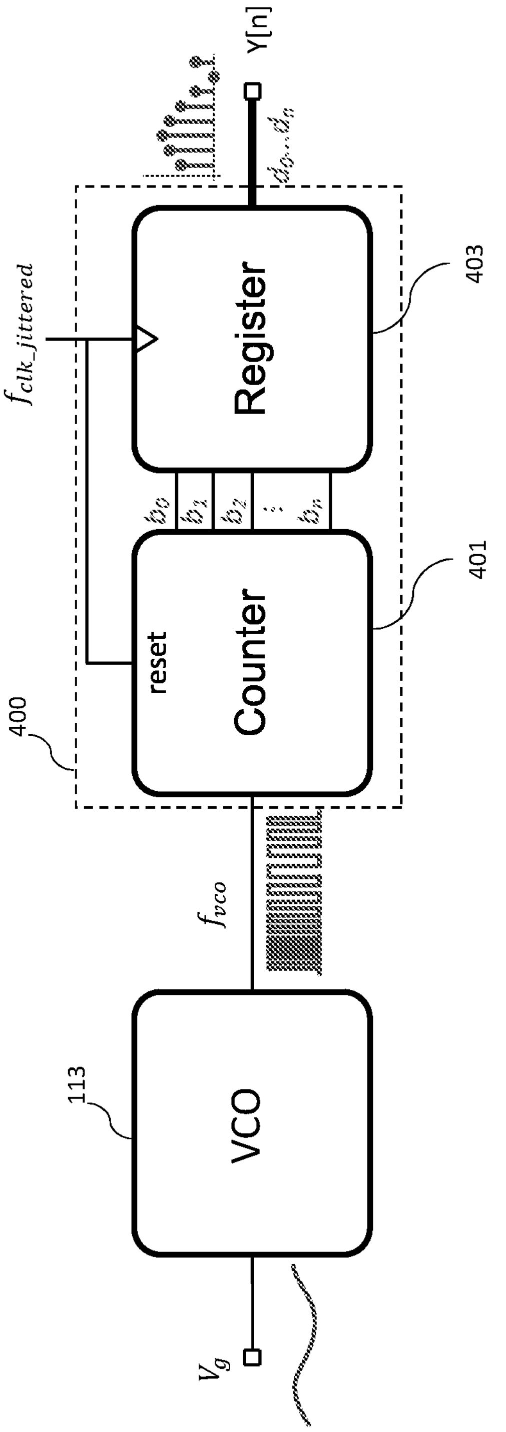
FIG. 4A illustrates a frequency-to-digital (FTD) converter, in an embodiment.

FIG. 4A illustrates a frequency-to-digital (FTD) converter 400, in an embodiment. The FTD converter 400 may be used as the FTD converter 115 in FIG. 1. Note that the VCO 113 of FIG. 1 is shown in FIG. 4A to illustrate the connection of the FTD converter 400, with the understanding that the VCO 113 is not part of the FTD converter 400.

As illustrated in FIG. 4A, the FTD converter 400 includes a counter 401 and a register 403. An input terminal of the counter 401 is coupled to the frequency modulated signal $f_{vco}$ generated by the VCO 113. A RESET terminal of the counter 401 is coupled to the phase modulated clock signal $f_{clk\_jittered}$. The counter 401 is configured to count the number of cycles (may also be referred to as oscillator cycles) in the frequency modulated signal $f_{vco}$ between adjacent active edges (e.g., rising edges, or falling edges) of the phase modulated clock signal $f_{clk\_jittered}$.

The output of the counter 401, which is a multi-bit digital signal, is sent to the register 403. A clock terminal of the register 403 is coupled to the phase modulated clock signal $f_{clk\_jittered}$. The register 403 is configured to latch the multi-bit digital signal at the output of the counter 401 at active edges of the phase modulated clock signal $f_{clk\_jittered}$. In other words, the multi-bit digital signal at the output of the counter 401 is sampled at the active edges of the phase modulated clock signal $f_{clk\_jittered}$, and the sampled value is outputted as the digital output signal y[n] of the FTD converter 400.

Figure 4B:
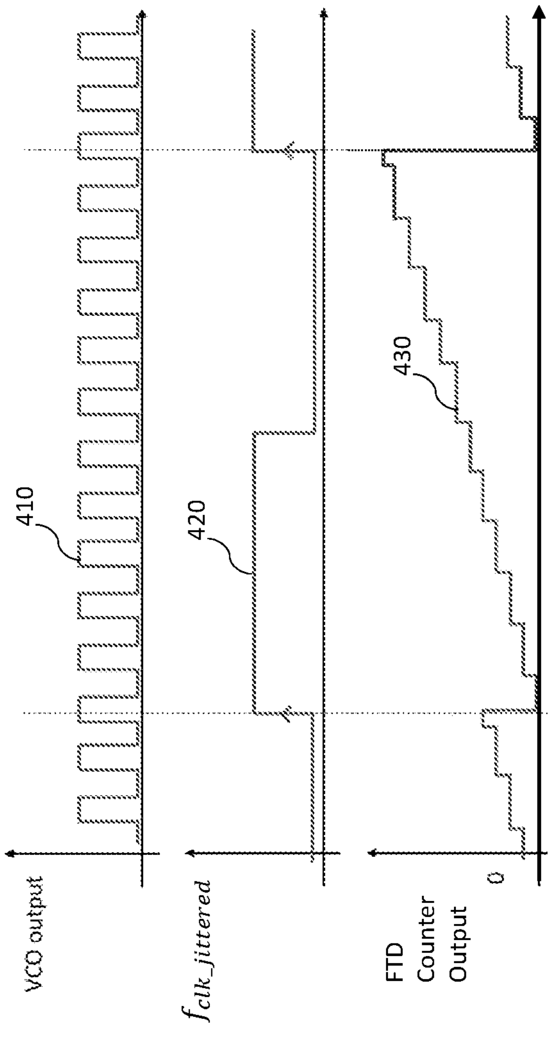
FIG. 4B illustrates an output of the FTD converter in FIG. 4A, in an embodiment.

FIG. 4B illustrates an output of the FTD converter in FIG. 4A, in an embodiment. In FIG. 4B, the signal 410 in the top subplot illustrates the output of the VCO 113, which is the frequency modulated signal $f_{vco}$. The signal 420 in the middle subplot illustrates the output of the phase modulator 123, which is the phase modulated clock signal $f_{clk\_jittered}$. The signal 430 illustrates the output of the counter 401 in the FTD converter 400. As illustrated in FIG. 4B, the counter output resets to zero at the rising edges of the phase modulated clock signal $f_{clk\_jittered}$, then increases as the counter 401 counts the cycles in the frequency modulated signal $f_{vco}$. At the next rising edges, the output signal of the counter 401 is latched into the register 403, and the counter 401 is reset to zero again.

Figure 5B:
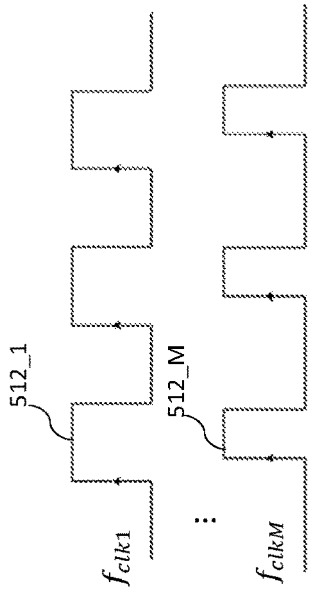
FIG. 5B illustrates clock signals used in the phase modulator of FIG. 5A, in an embodiment.
Figure 5A:
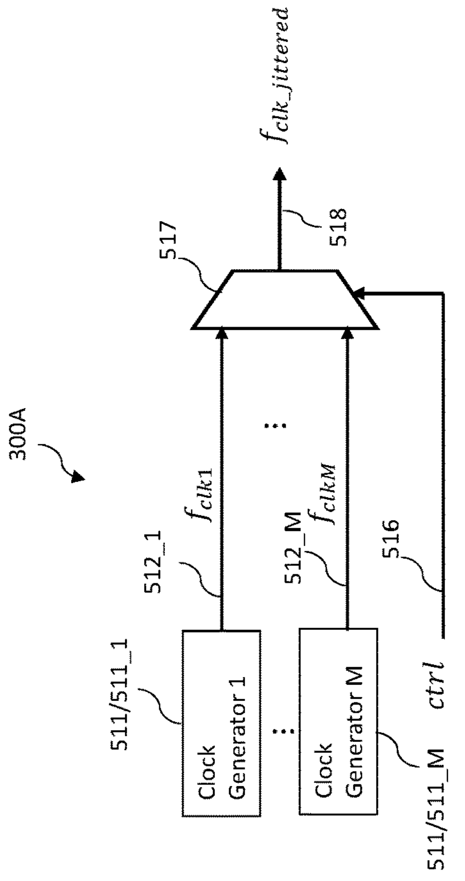
FIG. 5A illustrates a phase modulator, in another embodiment.

FIG. 5A illustrates a phase modulator 300A, in another embodiment. The phase modulator 300A may be used as the phase modulator 123 in FIG. 1. The phase modulator 300A include a plurality of clock signal generators 511 (e.g., 511_1, 511_2, . . . , and 511_M). Each of the clock signal generators 511 generates a clock signal that has the same frequency as the system sampling clock signal $f_{clk}$ but with different duty cycles. The clock signals generated by the clock signal generators 511 are denoted as $f_{clk1}$, $f_{clk2}$, . . . , $f_{clkM}$ in FIG. 5A.

FIG. 5B illustrates the clock signals $f_{clk}1$, $f_{clk2}$, . . . , $f_{clkM}$ generated by the clock generators 511 in FIG. 5A, in an embodiment. As illustrated in FIG. 5B, the clock signal $f_{clk1}$, $f_{clk2}$, . . . , $f_{clkM}$ have the same frequency. However, due to the different duty cycles, the active edges (e.g., rising edges) of the clock signals $f_{clk1}$, $f_{clk2}$, . . . , $f_{clkM}$ are not aligned, and instead, there are time delays between the active edges of the clock signals $f_{clk1}$, $f_{clk2}$, . . . , $f_{clkM}$.

Referring back to FIG. 5A. the phase modulator 300A further includes a multiplexer 517. The output terminals 512 (e.g., 512_1, 512_2, . . . , 512_M) of the clock signal generators 511 are connected to the input terminals of the multiplexer 517. A control terminal 516 of the multiplexer is connected to the output terminal of the random number generator 121 in FIG. 1. Similar to the discussion above for the phase modulator 300, the random number generator 121 generates random numbers at the same frequency as the frequency of the system sampling clock signal $f_{clk}$, such that for each active edge of the system sampling clock signal $f_{clk}$, a random number is generated. The random number is used to select one of the clock signals $f_{clk1}$, $f_{clk2}$, . . . , $f_{clkM}$, and the selected clock signal is outputted at an output terminal 518 of the multiplexer 517 as the phase modulated clock signal $f_{clk\_jittered}$. Therefore, the random numbers are used to introduce random delays (e.g., random phase delays, or jitter) to the active edges of the system sampling clock signal folk to generate the phase modulated clock signal $f_{clk\_jittered}$.

During operation of the MEMS microphone system 100, when no sound is applied to the capacitive MEMS microphone 103, the VCO 113 oscillates at a rest frequency determined by the bias voltage $V_{bias}$ that sets the operating point of the VCO 113 through the high-ohmic resistor 105. In the event of a mechanical shock or a very strong audio signal, the MEMS membrane of the capacitive MEMS microphone 103 may collapse, and as a result, the VCO 113 is suddenly brought out of the operating point. Given the long time constant imposed by the high-ohmic resistor 105 together with the MEMS capacitance, it may take a few seconds for the MEMS microphone 103 to recover to the proper bias point.

Figure 6:
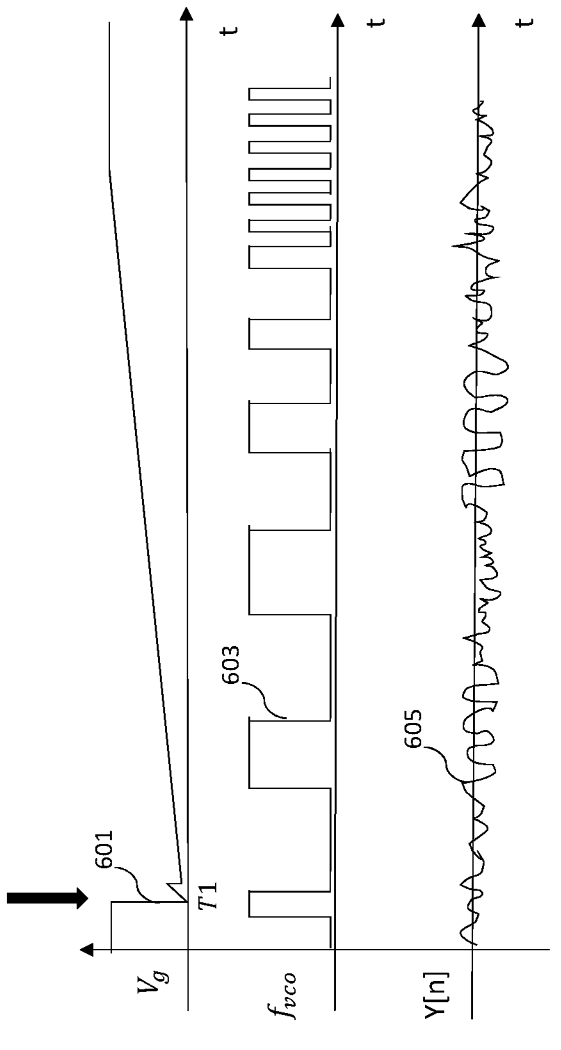
FIG. 6 illustrates output of a MEMS microphone system in response to a mechanical shock, in an embodiment.

FIG. 6 illustrates output of the MEMS microphone system 100 in response to a mechanical shock or a very strong audio signal, in an embodiment. In FIG. 6, the curve 601 shows the output voltage $V_g$ of the capacitive MEMS microphone 103. The curve 603 shows the output signal $f_{vco}$ of the VCO 113, and the curve 605 shows the digital output signal y[n] of the FTD converter 115. At a time instant T1 indicated by the arrow in FIG. 6, a mechanical shock or a strong audio signal causes the MEMS membrane to temporarily collapse, resulting in the output voltage $V_g$ of the capacitive MEMS microphone 103 falling to zero. After the time instant T1, the output voltage $V_g$ gradually sweeps to the nominal bias point, and as a result, the output signal $f_{vco}$ of the VCO 113 also sweeps slowly in frequency through a large frequency span.

During this frequency sweep, the VCO 113 may stay for a few milliseconds at frequencies close to integer multiples ($N_1$, $N_2$, . . . ) of the frequency of the system sampling clock signal $f_{clk}$. When this happens, a low frequency tone resulting from the beat between the system sampling clock signal $f_{clk}$ and the VCO output signal $f_{vco}$, denoted as $f_{beat}=f_{vco}-N_i\times f_{clk}$, may fall into the audio band and produce an audible whistle. This audible whistle is unpleasant for the listener and should be suppressed. Note that in the above equation for the beat signal, $f_{vco}$ and $f_{clk}$ are used to denote the frequencies of their respective name-sake signals.

Different solutions to the audible whistle problem exist. The currently disclosed MEMS microphone system 100 offers advantages over other solutions. To appreciate the advantages of the disclosed embodiment herein, consider a reference MEMS microphone system similar to the MEMS microphone system 100 in FIG. 1, but without the random number generator 121 and without the phase modulator 123. The reference MEMS microphone system sends the system sampling clock signal $f_{clk}$ to the clock input terminal of the FTD converter 115. In order to suppress the audile whistle, the reference MEMS microphone system dithers the output signal $V_g$ of the MEMS microphone 103 by adding a random, low level, noise shaped analog signal to the output signal $V_g$. This way, the VCO 113 is slightly modulated by the random noise, and after sampling using the system sampling clock signal $f_{clk}$, the aliased tone (e.g., the audible whistle) is masked by noise, thus minimizing the psycho-acoustic effect of the tone.

However, the above dithering solution of the reference MEMS microphone system has many disadvantages. For example, it requires a digital-to-analog converter (DAC) to generate the analog random noise signal, and the DAC may also require a coupling circuit to the reference MEMS microphone system's highly sensitive input node, which can worsen the sensitivity and the overall noise budget. In addition, the dithering solution diminishes the dynamic range of the MEMS microphone, as a noise signal is always present in the reference MEMS microphone system during operation. Furthermore, the dithering solution requires a spectrally-shaped random noise generator.

The disclosed embodiment herein is based on the observation that the low frequency tones (e.g., audible whistle) do not appear in the VCO 113 itself but in the sampling process. The dithering solution modulates the VCO 113 with an analog random noise signal to mitigate the low frequency tones when sampling. In contrast, the disclosed embodiment herein does not alter the operation of the VCO 113, but samples the output of the FTD converter 115 with a clock signal (e.g., $f_{clk\_jittered}$) whose phase has been intentionally modulated by a random sequence. In the illustrated embodiment, the random number generator 121, through the phase modulator 123, introduces random errors in the digital output signal y[n] of the MEMS microphone system 100. These errors decorrelate the sweeping VCO frequency with the system sampling clock, which has the effect of randomizing the whistles that now appear as noise. The errors introduced by modulating the phase of the system sampling clock signal result in a first-order noise shaped error sequence at the output of the FTD converter 115, regardless of the spectral contents of the random sequence. Therefore, the disclosed embodiment herein avoids the disadvantages of the dithering solution of the reference MEMS microphone system, thus suppressing the audible whistle without adversely affecting the sensitivity, the overall noise budget, and the dynamic range of the MEMS microphone system. In addition, no DAC circuit or noise-shaping circuit is needed for the disclosed embodiment, thus saving production cost and energy consumption.

Figure 7A:
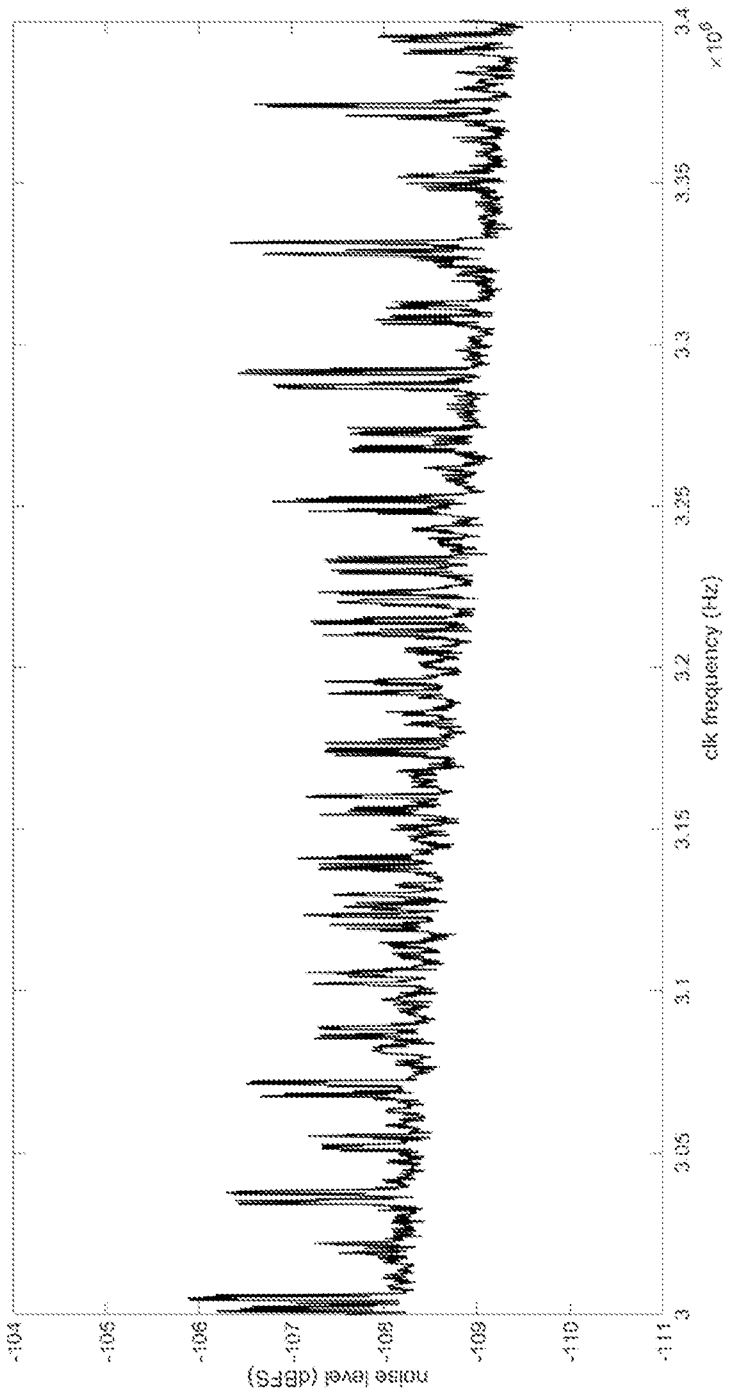
FIGS. 7A and 7B illustrate performance of the disclosed MEMS microphone system, in an embodiment.
Figure 7B:
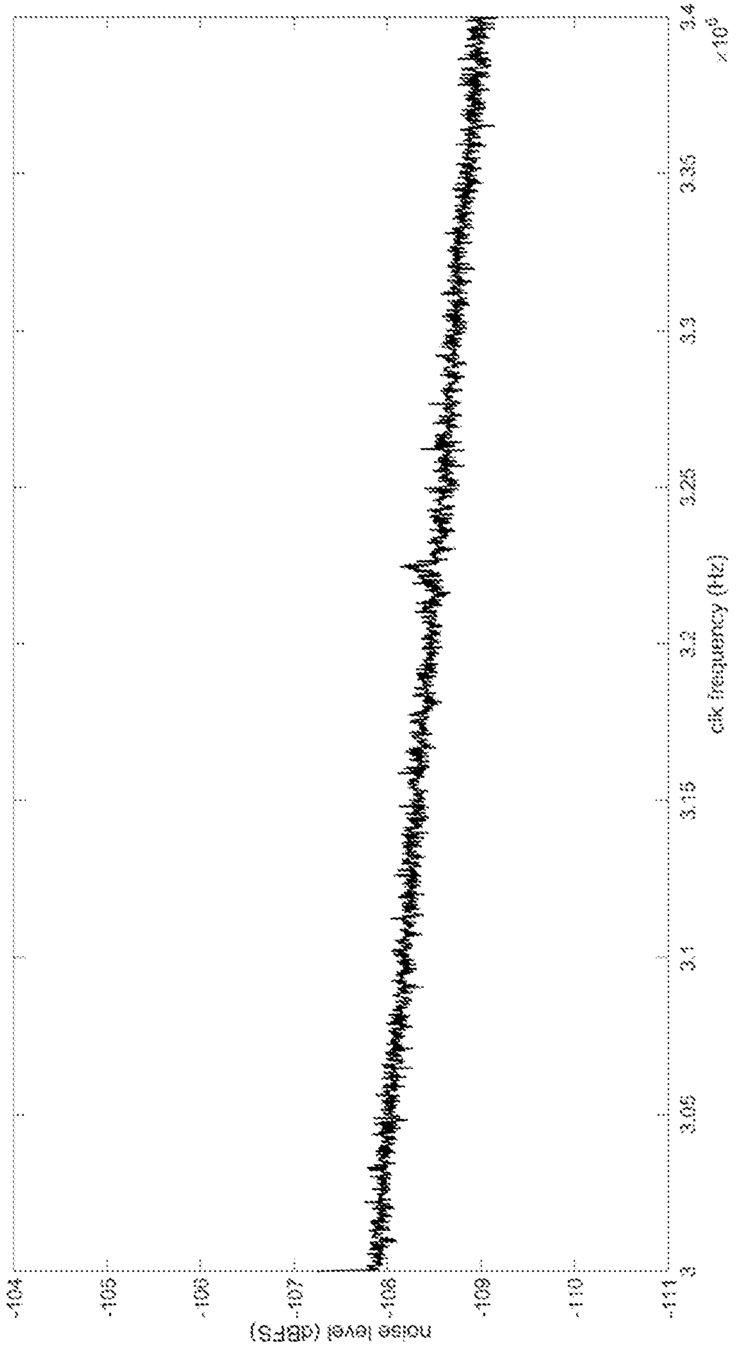

FIGS. 7A and 7B illustrate the performance of the disclosed MEMS microphone system 100, in an embodiment. The disclosed VCO-ADC is implemented in an application specific integrated circuit (ASIC) and tested in a MEMS microphone system with a capacitive MEMS microphone. FIGS. 7A and 7B show the obtained ASIC level noise versus a system clock sweep when no sound signal is applied to the capacitive MEMS microphone. For comparison, FIGS. 7A and 7B show the performance of the MEMS microphone system without and with the phase jitter added to the system sampling clock signal $f_{clk}$, respectively. In FIGS. 7A and 7B, the x-axis shows the sweeping range of the system sampling clock signal folk. The y-axis shows the integrated noise in the application bandwidth (which is the audio bandwidth in this case) at the ASIC output, measured in dBFS unit for every sampling frequency in the frequency sweeping range. In FIG. 7A, the clock jitter (e.g., phase jitter) is not applied, and the system sampling clock signal $f_{clk}$ is sent to the clock input terminal of the FTD converter 115. In FIG. 7B, clock jitter is applied using the phase modulator 123 and the random number generator 121 to generate the phase modulated clock signal $f_{clk\_jettered}$, and the phase modulated clock signal $f_{clk\_jettered}$ is sent to the clock input terminal of the FTD converter 115.

In FIG. 7A, it is observed that for certain values of the system sampling clock frequency, noise peaks appear (e.g., due to integer multiple relationship between $f_{vco}$ and $f_{clk}$, as mentioned before) if no phase jitter is applied. In FIG. 7B, when jitter is added to the phase of the system sampling clock signal $f_{clk}$, the noise peaks are mitigated significantly. Therefore, the potential audible whistle caused by a microphone shock or a strong audio signal will be suppressed by the disclosed embodiment.

Figure 8:
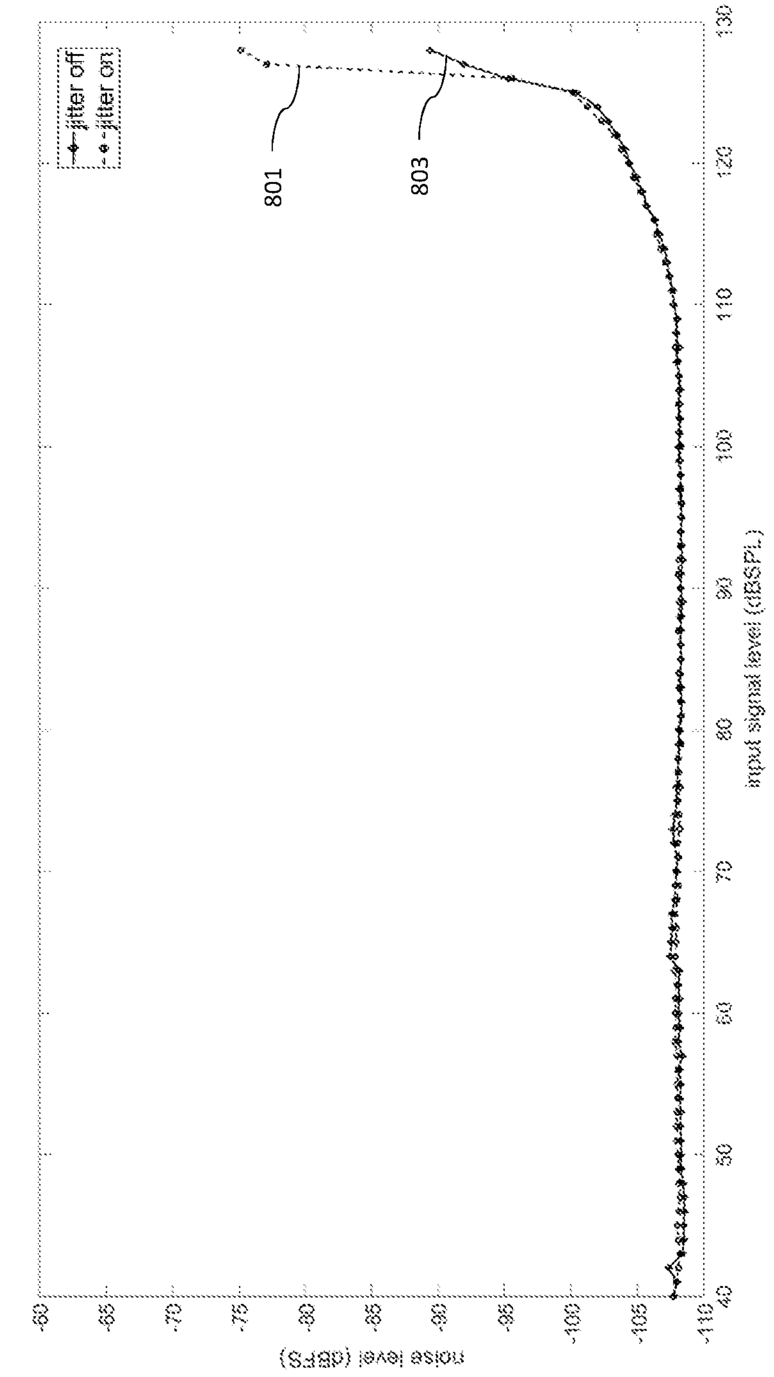
FIG. 8 illustrates performance of the disclosed MEMS microphone system, in another embodiment.

FIG. 8 illustrates the performance of the disclosed MEMS microphone system 100, in another embodiment. FIG. 8 show the obtained ASIC level noise versus input signal level. In the test of FIG. 8, an input signal (e.g., a 1 KHz tone) is applied at the capacitive MEMS microphone input. A defined system sampling clock frequency is set. The level of the input signal is swept from 40 dBSPL to 130 dBSPL. The integrated noise in the application bandwidth (which is the audio bandwidth in this case) at the ASIC output is measured in dBFS unit for every input signal level. The measured noise level at the VCO-ADC output (e.g., the digital output of the FTD converter 115) represents the noise contribution from different noise sources, such as flicker noise, thermal noise, or the like. In FIG. 8, the curve 803 shows the measured noise level when the phase jitter is not added to the system sampling clock signal $f_{clk}$, and the curve 801 shows the measured noise level when the jitter is added to the system sampling clock signal $f_{clk}$. It is observed from FIG. 8 that the curves 801 and 803 overlap over the normal operation range for the input signal level, and there are some differences between curves 801 and 803 only at extremely large input signal levels that are out of the normal operation range. Therefore, FIG. 8 shows that adding phase jitter to the system sampling clock signal $f_{clk}$ using the disclosed circuit has negligible effect on the measured noise level over the normal operation range.

Figure 9:
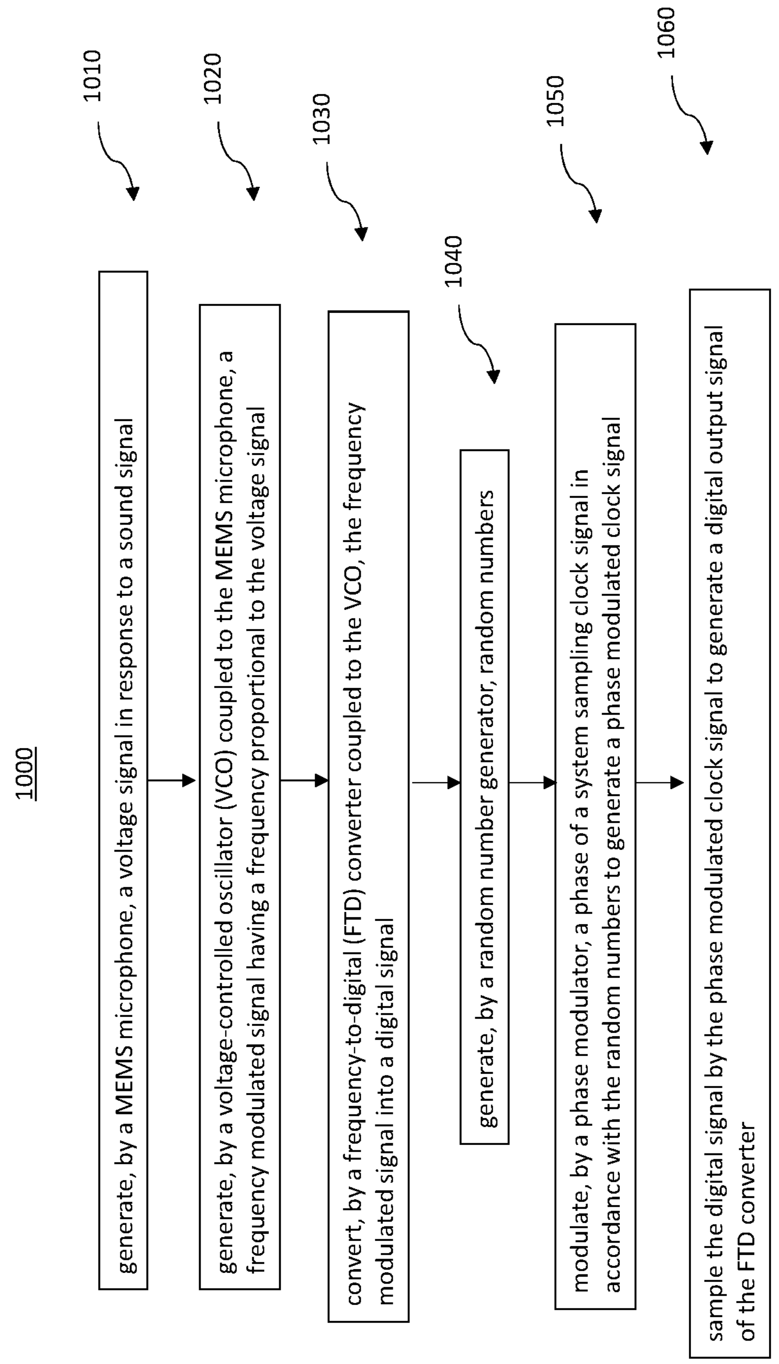
FIG. 9 illustrates a flow chart of a method of operating a MEMS microphone system, in an embodiment.

FIG. 9 illustrates a flow chart of a method 1000 of operating a MEMS microphone system, in an embodiment. It should be understood that the embodiment method shown in FIG. 9 is merely an example of many possible embodiment methods. One of ordinary skill in the art would recognize many variations, alternatives, and modifications. For example, various steps as illustrated in FIG. 9 may be added, removed, replaced, rearranged, or repeated.

Referring to FIG. 9, at block 1010, a voltage signal is generated by a MEMS microphone in response to a sound signal. At block 1020, a frequency modulated signal having a frequency proportional to the voltage signal is generated by a voltage-controlled oscillator (VCO) coupled to the MEMS microphone. At block 1030, the frequency modulated signal is converted into a digital signal by a frequency-to-digital (FTD) converter coupled to the VCO. At block 1040, random numbers are generated by a random number generator. At block 1050, a phase of a system sampling clock signal is modulated by a phase modulator in accordance with the random numbers to generate a phase modulated clock signal. At block 1060, the digital signal is sampled by the phase modulated clock signal to generate a digital output signal of the FTD converter.

Embodiments may achieve advantages as described below. The disclosed VCO-ADC circuit with phase modulator can be implemented as a compact, purely digital circuit, and there is no need to interfere with the sensitive analog circuitry of the MEMS interface. The dynamic range of the VCO-ADC circuit is not compromised by the injection of the random phase jitter into the system sampling clock signal. The random sequence generated by the random number generator does not need to be noise shaped, and therefore, a simple random number generator such as a LFSR register is sufficient. Compared with the dithering solution, the disclosed embodiment achieves reduced area and power consumption.

Examples of the present invention are summarized here. Other examples can also be understood from the entirety of the specification and the claims filed herein.

Example 1. In an embodiment, a circuit includes: a capacitive micro-electromechanical system (MEMS) microphone configured to output a voltage signal in response to a sound signal; and a voltage-controlled-oscillator-based analog-to-digital converter (VCO-ADC) coupled to the capacitive MEMS microphone and configured to generate a digital output signal proportional to the voltage signal, wherein the VCO-ADC comprises: a voltage-controlled-oscillator (VCO) coupled to the capacitive MEMS microphone and configured to output a frequency modulated signal having a frequency proportional to the voltage signal; a frequency-to-digital (FTD) converter coupled to an output terminal of the VCO; a random number generator configured to generate random numbers; and a phase modulator configured to generate a phase modulated clock signal by modulating a phase of a system sampling clock signal with the random numbers, wherein the FTD converter is configured to generate a digital signal in accordance with the frequency modulated signal and the phase modulated clock signal, and is configured to generate the digital output signal of the FTD converter by sampling the digital signal using the phase modulated clock signal.

Example 2. The circuit of Example 1, further comprising: an input stage circuit coupled between a first terminal of the capacitive MEMS microphone and the VCO; a resistor coupled between the first terminal of the capacitive MEMS microphone and a node, wherein the node is configured to receive a bias voltage for the capacitive MEMS microphone; and a charge pump circuit coupled to a second terminal of the capacitive MEMS microphone.

Example 3. The circuit of Example 1, wherein the phase modulated clock signal has a same frequency as the system sampling clock signal, wherein active edges of the phase modulated clock signal are shifted from respective active edges of the system sampling clock signal by different amount of time in accordance with the random numbers.

Example 4. The circuit of Example 3, wherein the random number generator is configured to generate the random numbers at a frequency of the phase modulated clock signal.

Example 5. The circuit of Example 3, wherein the FTD converter comprises a counter configured to count the number of cycles in the frequency modulated signal between adjacent active edges of the phase modulated clock signal, wherein the digital signal generated by the FTD converter is the output of the counter.

Example 6. The circuit of Example 5, wherein the phase modulator comprises: a delay chain comprising a plurality of delay circuits coupled in series, wherein an input terminal of the delay chain is coupled to the system sampling clock signal; and a multiplexer, wherein input terminals of the multiplexer are coupled to output terminals of the plurality of delay circuits, wherein a control terminal of the multiplexer is coupled to an output terminal of the random number generator, wherein the multiplexer is configured to, based on the random numbers at the control terminal, select a clock signal at one of the input terminals of the multiplexer as the phase modulated clock signal.

Example 7. The circuit of Example 5, wherein the phase modulator comprises: a plurality of clock signal generators configured to generate a plurality of clock signals, wherein the plurality of clock signals have a same frequency as the system sampling clock signal but different duty cycles; and a multiplexer, wherein input terminals of the multiplexer are coupled to output terminals of the plurality of clock signal generators, wherein a control terminal of the multiplexer is coupled to an output terminal of the random number generator, wherein the multiplexer is configured to, based on the random numbers at the control terminal, select a clock signal at one of the input terminals of the multiplexer as the phase modulated clock signal.

Example 8. In an embodiment, a circuit includes: a capacitive micro-electromechanical system (MEMS) microphone configured to generate a voltage signal in response to a sound signal; a voltage-controlled oscillator (VCO) coupled to the capacitive MEMS microphone, wherein the VCO is configured to generate a frequency modulated signal having a frequency proportional to the voltage signal; a frequency-to-digital (FTD) converter coupled to an output terminal of the VCO; a random number generator configured to generate random numbers; and a phase modulator configured to generate a phase modulated clock signal by modulating a phase of a system sampling clock signal in accordance with the random numbers, wherein the FTD converter is configured to generate a digital signal in accordance with the frequency modulated signal and the phase modulated clock signal, and is configured to sample the digital signal by the phase modulated clock signal to generate a digital output signal of the FTD converter.

Example 9. The circuit of Example 8, wherein the capacitive MEMS microphone comprises a capacitor.

Example 10. The circuit of Example 9, further comprising: a source follower circuit coupled between a first terminal of the capacitive MEMS microphone and the VCO; a charge pump circuit coupled to a second terminal of the capacitive MEMS microphone; and a resistor coupled between the first terminal of the capacitive MEMS microphone and a node, wherein the node is configured to receive a bias voltage for the capacitive MEMS microphone.

Example 11. The circuit of Example 8, wherein the phase modulator is configured to generate the phase modulated clock signal by shifting active edges of the system sampling clock signal by different amount of time determined by the random numbers.

Example 12. The circuit of Example 11, wherein the FTD converter is configured to generate the digital signal by counting the number of cycles in the frequency modulated signal between adjacent active edges of the phase modulated clock signal.

Example 13. The circuit of Example 12, wherein the random number generator is configured to generate the random numbers at a same frequency as a frequency of the system sampling clock signal.

Example 14. The circuit of Example 8, wherein the phase modulator is configured to generate the phase modulated clock signal by choosing, from a plurality of candidate clock signals having a same frequency as the system sampling clock signal but different duty cycles, a candidate clock signal as the phase modulated clock signal at active edges of the system sampling clock signal based on the random numbers.

Example 15. The circuit of Example 14, wherein the random number generator is configured to generate a random number for a respective active edge of the system sampling clock signal.

Example 16. The circuit of Example 15, wherein the random number generator is a Linear Feedback Shift Register (LFSR) random number generator.

Example 17. In an embodiment, a method of operating a micro-electromechanical system (MEMS) microphone system includes: generating, by a MEMS microphone, a voltage signal in response to a sound signal; generating, by a voltage-controlled oscillator (VCO) coupled to the MEMS microphone, a frequency modulated signal having a frequency proportional to the voltage signal; converting, by a frequency-to-digital (FTD) converter coupled to the VCO, the frequency modulated signal into a digital signal; generating, by a random number generator, random numbers; modulating, by a phase modulator, a phase of a system sampling clock signal in accordance with the random numbers to generate a phase modulated clock signal; and sampling the digital signal by the phase modulated clock signal to generate a digital output signal of the FTD converter.

Example 18. The method of Example 17, wherein the modulating comprises shifting, by the phase modulator, active edges of the system sampling clock signal by different amount of time determined by the random numbers.

Example 19. The method of Example 18, wherein the converting comprises counting, by a counter of the FTD converter, the number of cycles in the frequency modulated signal between adjacent active edges of the phase modulated clock signal.

Example 20. The method of Example 19, wherein generating the random number comprises generating, by the random number generator, the random numbers at a same frequency as a frequency of the system sampling clock signal.

While this invention has been described with reference to illustrative examples, this description is not intended to be construed in a limiting sense. Various modifications and combinations of the illustrative examples, as well as other examples of the invention, will be apparent to persons skilled in the art upon reference to the description. It is therefore intended that the appended claims encompass any such modifications or examples.

What is claimed is:

1. A circuit comprising:

a capacitive micro-electromechanical system (MEMS) microphone configured to output a voltage signal in response to a sound signal; and a voltage-controlled-oscillator-based analog-to-digital converter (VCO-ADC) coupled to the capacitive MEMS microphone and configured to generate a digital output signal proportional to the voltage signal, wherein the VCO-ADC comprises:

a voltage-controlled-oscillator (VCO) coupled to the capacitive MEMS microphone and configured to output a frequency modulated signal having a frequency proportional to the voltage signal;

a frequency-to-digital (FTD) converter coupled to an output terminal of the VCO;

a random number generator configured to generate random numbers; and a phase modulator configured to generate a phase modulated clock signal by modulating a phase of a system sampling clock signal with the random numbers, wherein the FTD converter is configured to generate a digital signal in accordance with the frequency modulated signal and the phase modulated clock signal, and is configured to generate the digital output signal of the FTD converter by sampling the digital signal using the phase modulated clock signal.

2. The circuit of claim 1, further comprising:

an input stage circuit coupled between a first terminal of the capacitive MEMS microphone and the VCO;

a resistor coupled between the first terminal of the capacitive MEMS microphone and a node, wherein the node is configured to receive a bias voltage for the capacitive MEMS microphone; and a charge pump circuit coupled to a second terminal of the capacitive MEMS microphone.

3. The circuit of claim 1, wherein the phase modulated clock signal has a same frequency as the system sampling clock signal, wherein active edges of the phase modulated clock signal are shifted from respective active edges of the system sampling clock signal by different amounts of time in accordance with the random numbers.

4. The circuit of claim 3, wherein the random number generator is configured to generate the random numbers at a frequency of the phase modulated clock signal.

5. The circuit of claim 3, wherein the FTD converter comprises a counter configured to count the number of cycles in the frequency modulated signal between adjacent active edges of the phase modulated clock signal, wherein the digital signal generated by the FTD converter is the output of the counter.

6. The circuit of claim 5, wherein the phase modulator comprises:

a delay chain comprising a plurality of delay circuits coupled in series, wherein an input terminal of the delay chain is coupled to the system sampling clock signal; and a multiplexer, wherein input terminals of the multiplexer are coupled to output terminals of the plurality of delay circuits, wherein a control terminal of the multiplexer is coupled to an output terminal of the random number generator, wherein the multiplexer is configured to, based on the random numbers at the control terminal, select a clock signal at one of the input terminals of the multiplexer as the phase modulated clock signal.

7. The circuit of claim 5, wherein the phase modulator comprises:

a plurality of clock signal generators configured to generate a plurality of clock signals, wherein the plurality of clock signals have a same frequency as the system sampling clock signal but different duty cycles; and a multiplexer, wherein input terminals of the multiplexer are coupled to output terminals of the plurality of clock signal generators, wherein a control terminal of the multiplexer is coupled to an output terminal of the random number generator, wherein the multiplexer is configured to, based on the random numbers at the control terminal, select a clock signal at one of the input terminals of the multiplexer as the phase modulated clock signal.

8. A circuit comprising:

a capacitive micro-electromechanical system (MEMS) microphone configured to generate a voltage signal in response to a sound signal;

a voltage-controlled oscillator (VCO) coupled to the capacitive MEMS microphone, wherein the VCO is configured to generate a frequency modulated signal having a frequency proportional to the voltage signal;

a frequency-to-digital (FTD) converter coupled to an output terminal of the VCO;

a random number generator configured to generate random numbers; and a phase modulator configured to generate a phase modulated clock signal by modulating a phase of a system sampling clock signal in accordance with the random numbers, wherein the FTD converter is configured to generate a digital signal in accordance with the frequency modulated signal and the phase modulated clock signal, and is configured to sample the digital signal by the phase modulated clock signal to generate a digital output signal of the FTD converter.

9. The circuit of claim 8, wherein the capacitive MEMS microphone comprises a capacitor.

10. The circuit of claim 9, further comprising:

a source follower circuit coupled between a first terminal of the capacitive MEMS microphone and the VCO;

a charge pump circuit coupled to a second terminal of the capacitive MEMS microphone; and a resistor coupled between the first terminal of the capacitive MEMS microphone and a node, wherein the node is configured to receive a bias voltage for the capacitive MEMS microphone.

11. The circuit of claim 8, wherein the phase modulator is configured to generate the phase modulated clock signal by shifting active edges of the system sampling clock signal by different amounts of time determined by the random numbers.

12. The circuit of claim 11, wherein the FTD converter is configured to generate the digital signal by counting the number of cycles in the frequency modulated signal between adjacent active edges of the phase modulated clock signal.

13. The circuit of claim 12, wherein the random number generator is configured to generate the random numbers at a same frequency as a frequency of the system sampling clock signal.

14. The circuit of claim 8, wherein the phase modulator is configured to generate the phase modulated clock signal by choosing, from a plurality of candidate clock signals having a same frequency as the system sampling clock signal but different duty cycles, a candidate clock signal as the phase modulated clock signal at active edges of the system sampling clock signal based on the random numbers.

15. The circuit of claim 14, wherein the random number generator is configured to generate a random number for a respective active edge of the system sampling clock signal.

16. The circuit of claim 15, wherein the random number generator is a Linear Feedback Shift Register (LFSR) random number generator.

17. A method of operating a micro-electromechanical system (MEMS) microphone system, the method comprising:

generating, by a MEMS microphone, a voltage signal in response to a sound signal;

generating, by a voltage-controlled oscillator (VCO) coupled to the MEMS microphone, a frequency modulated signal having a frequency proportional to the voltage signal;

converting, by a frequency-to-digital (FTD) converter coupled to the VCO, the frequency modulated signal into a digital signal;

generating, by a random number generator, random numbers;

modulating, by a phase modulator, a phase of a system sampling clock signal in accordance with the random numbers to generate a phase modulated clock signal; and sampling the digital signal by the phase modulated clock signal to generate a digital output signal of the FTD converter.

18. The method of claim 17, wherein the modulating comprises shifting, by the phase modulator, active edges of the system sampling clock signal by different amounts of time determined by the random numbers.

19. The method of claim 18, wherein the converting comprises counting, by a counter of the FTD converter, the number of cycles in the frequency modulated signal between adjacent active edges of the phase modulated clock signal.

20. The method of claim 19, wherein generating the random numbers comprises generating, by the random number generator, the random numbers at a same frequency as a frequency of the system sampling clock signal.

* * * * *